3,450,707
CERTAIN 2-ANILINO-PYRIDINE DERIVATIVES
Denis M. Bailey, East Greenbush, N.Y., assignor to Sterling Drug Inc., New York, N.Y., a corporation of Delaware
No Drawing. Filed Dec. 13, 1966, Ser. No. 601,333
Int. Cl. C07d 31/42
U.S. Cl. 260—296           7 Claims

ABSTRACT OF THE DISCLOSURE 2-(3-Q-anilino)-6-R-pyridines where Q is trifluoromethyl or fluoro and R is hydrogen or lower-alkyl and 1-oxides thereof, having anti-inflammatory properties, are prepared by reacting 2-halo-6-R-pyridine with 3-Q-aniline. The 1-oxides are prepared by oxidizing said anilinopyridines.

---

This invention relates to compositions of matter known in the art of chemistry as 2-anilino-pyridines and preparation thereof.

The invention sought to be patented, in its composition aspect, resides in the compounds of the Formula I

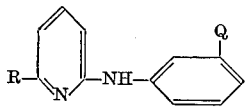

where R is hydrogen or lower-alkyl and Q is fluoro or trifluoromethyl, and 1-oxides thereof.

The invention sought to be patented, in its process aspect, resides in the process which comprises reacting 2-halo-6-R-pyridine with 3-Q-aniline where R and Q have the meanings given above for the compounds of Formula I.

The tangible embodiments of the composition aspect of the invention possess the inherent general physical properties of being white crystalline solids melting between about 50° and 150° C., which are substantially insoluble in water and which are of varying solubility in organic solvents. Examination of these compounds reveals, upon infrared and nuclear magnetic resonance spectrographic analyses, data confirming the molecular structure assigned to the compounds. These data, taken together with the nature of the starting materials, mode of synthesis and results of elementary analysis, positively confirm the structures of the compositions sought to be patented.

The tangible embodiments of the composition aspect of the invention possess the inherent applied use characteristics of exerting anti-inflammatory activity in animal organisms, as determined by standard pharmacological evaluation procedures in test animals.

The term "lower-alkyl," as used throughout this specification, means an alkyl radical having from one to six carbon atoms inclusive, illustrated by methyl, ethyl, isopropyl, n-propyl, n-butyl, sec-butyl, isobutyl, n-amyl, n-hexyl, and the like.

The compounds of Formula I are useful both in free base form and in acid-addition salt form and both forms are within the purview of the invention, and are considered to be one and the same invention. The acid-addition salts are simply a usually more convenient form for use; and, in practice, use of the salt form inherently amounts to use of the base form. The acids which can be used to prepare the acid-addition salts are preferably those which produce, when combined with the free base, pharmacodynamically acceptable salts, that is, salts whose anions are relatively innocuous to the animal organism in pharmacodynamic doses of the salts, so that the beneficial properties inherent in the free base are not vitiated by side effects ascribable to the anions; in other words, the latter do not substantially affect the pharmacodynamic properties inherent in the cations. Appropriate pharmacodynamically acceptable salts within the scope of the invention are those derived from mineral acids such as hydrochloric acid, hydrobromic acid, hydriodic acid, nitric acid, phosphoric acid, sulfamic acid, and sulfuric acid; and organic acids such as aetic acid, citric acid, tartaric acid, lactic acid, methanesulfonic acid, ethanesulfonic acid, quinic acid, and the like, giving the hydrochloride, hydrobromide, hydriodide, nitrate, phosphate, sulfamate, sulfate, acetate, citrate, tartrate, lactate, methanesulfonate, ethanesulfonate and quinate, respectively.

The acid-addition salts are prepared preferably by reacting the free base and acid in an organic solvent, e.g., ethanol, in which case the salt separates directly or can be obtained by concentration of the solution.

Although pharmacodynamically acceptable salts are preferred, all acid-addition salts are within the scope of my invention. All acid-addition salts are useful as sources of the free base form even if the particular salts per se is not desired as the final product, as for example when the salt is formed for purposes of purification or identification, or when it is used as an intermediate in preparing a pharmacodynamically acceptable salt by ion exchange procedures.

The manner and process of making and using the invention will now be generally described so as to enable a person skilled in the art of medicinal chemistry to make and use the same, as follows:

The reaction of the 2-halopyridine with 3-trifluoromethylaniline or 3-fluoroaniline to form the 2-(3-Q-anilino)pyridine of Formula I was conveniently carried out by carefully heating the reactants, preferably under an inert atmosphere, e.g., nitrogen, at about 140 to 160° C. Higher temperatures up to about 175° C. can be used; however, chances for decomposition are greater at higher temperatures. Lower temperatures down to about 100–120° C. can be used; however, the reaction will take longer at these lower temperatures. 2-bromopyridine was preferably used because of its ready availability; however, the other 2-halopyridines also can be used. The reaction was run preferably using about two molar equivalents of the aniline per mole of halopyridine, the second mole of aniline being present to take up the hydrogen halide formed by the reaction. Use of equal molar quantities of reactants will result in the formation of the hydrohalide salt of the anilinopyridine or in the formation of the free base form if run in the presence of a suitable acid-acceptor, e.g., N,N-dimethylaniline. The intermediates are known chemical compounds.

The 1-oxides of the compounds of Formula I are prepared by reacting the 2(3-Q-anilino)-6-R-pyridine, where Q and R are defined as above, with an oxidizing agent effective to oxidize pyridines to their 1-oxides, e.g., hydrogen peroxide, m-chlorobenzoic acid, peracetic acid, etc. The reaction is preferably run in a suitable solvent, e.g., glacial acetic acid, chloroform, etc., and is preferably carried out by heating the 2-anilinopyridine with hydrogen peroxide in glacial acetic acid.

The best mode contemplated for carrying out the invention will now be set forth as follows:

(1) 2-(3-trifluoromethylanilino)pyridine.—A mixture containing 31.6 g. of 2-bromopyridine and 64.4 g. of 3-trifluoromethylaniline was heated under an atmosphere of nitrogen in an oil bath by gradually taking the temperature up to 150° over a period of one hour and then heating at 150° for six hours. To the reaction mixture was added 100 ml. of 10% aqueous sodium hydroxide solution and the resulting alkaline mixture was steam distilled to remove the excess 3-trifluoromethylaniline. After about one liter of distillate had been collected, the residue was allowed to cool whereupon it solidified. The solid was taken up in ether and the ether solution dried over anhydrous sodium sulfate. The ether solution was concentrated in vacuo to remove part of the ether and n-hexane added to incipient crystallization. After two hours at room temperature, the resulting crystalline product was collected and dried at 40° C. in vacuo to yield 37.8 g. of 2-(3-trifluoromethylanilino)pyridine, M.P. 88–89° C. When tested for anti-inflammatory activity by the standard evaluation procedure inhibiting carrageenin-induced local foot edema in fasted rats, 2-(3-trifluoromethylanilino)pyridine was found to cause 19, 38, 46 and 62 percent inhibition at the respective doses of 12.5, 50, 100 and 200 mg./kg. orally. This compound also was found to have an oral $ALD_{50}$ of >1350 mg./kg. in rats.

Reaction of 2-(3-trifluoromethylanilino)pyridine with hydrogen chloride yields its hydrochloride salt.

(2) 2-(3-fluoroanilino)pyridine, M.P. 60.5–63.0° C., was prepared following the procedure described in Example 1 using 39.5 g. of 2-bromopyridine and 56 g. of 3-fluoroaniline. The product was extracted with chloroform rather than ether and was recrystallized once from chloroform-n-hexane and once from n-hexane using decolorizing charcoal. 2-(3-fluoroanilino)pyridine was found to cause 18, 40 and 80 percent inhibition of carrageenin-induced local foot edema in fasted rats at the respective doses of 25, 100 and 400 mg./kg. orally.

(3) 6 - methyl - 2 - (3 - trifluoromethylanilino)pyridine, M.P. 56.0–57.5° C., was prepared following the procedure described in Example 1 using 43 g. of 2-bromo-6-methylpyridine and 80.5 g. of 3-trifluoromethylaniline. The product was extracted from the reaction mixture from chloroform and recrystallized from n-pentane.

(4) 2 - (3 - trifluoromethylanilino)pyridine - 1 - oxide.—A mixture containing 25.0 g. of 2-(3-trifluoromethylanilino)pyridine, 80 ml. of glacial acetic acid and 26 ml. of 30% hydrogen peroxide was heated for nineteen hours in an oil bath kept at 80–85° C. After removal of volatile material by heating in vacuo, the residual gummy material was taken up in chloroform. The chloroform solution was washed successively with 10% aqueous potassium carbonate solution and then sodium chloride solution, dried over anhydrous sodium sulfate, treated with decolorizing charcoal and filtered, and evaporated in vacuo to remove the chloroform. The remaining solid was recrystallized from 60 ml. of acetonitrile to yield 10.6 g. of 2-(3-trifluoromethylanilino)pyridine-1-oxide, M.P. 135–137° C. This compound was found to cause 52% inhibition of carrageenin-induced local foot edema in fasted rats at 100 mg./kg. orally.

(5) 6 - methyl - 2 - (3 - trifluoromethylanilino)pyridine-1-oxide, M.P. 101–102.5° C. was prepared following the procedure described in Example 4 using 8.3 g. of 6-methyl - 2 - (3 - trifluoromethylanilino)pyridine, 50 ml. of glacial acetic acid, 10 ml. of hydrogen peroxide and a heating period of 45–50° C. for about sixteen hours and then at 80–85° C. for about six hours. This compound was found to cause 2, 45 and 75 percent inhibition of carrageenin-induced local foot edema in fasted rats at the respective doses of 25, 100 and 400 mg./kg. orally.

(6) 2 - (3 - fluoroanilino)pyridine - 1 - oxide is obtained following the procedure described in Example 3 using a molar equivalent quantity of 2-(3-fluoroanilino)-pyridine in place of 2-(3-trifluoromethylanilino)pyridine.

The subject matter which the applicant regards as his invention is particularly pointed out and distinctly claimed as follows:

1. A 2-anilinopyridine of the formula

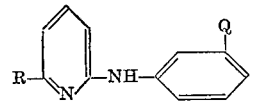

where R is hydrogen or lower-alkyl and Q is fluoro or trifluoromethyl, or its 1-oxide.

2. 2 - (3 - trifluoromethylanilino)pyridine according to claim 1 where R is hydrogen and Q is trifluoromethyl.

3. 6 - methyl - 2 - (3 - trifluoromethylanilino)pyridine according to claim 1 where R is methyl and Q is trifluoromethyl.

4. 2-(3-fluoroanilino)pyridine according to claim 1 where R is hydrogen and Q is fluoro.

5. The 1 - oxide of 2 - (3 - trifluoromethylanilino)pyridine according to claim 1 where R is hydrogen and Q is trifluoromethyl.

6. The 1 - oxide of 6 - methyl - 2 - (3 - trifluoromethylanilino)pyridine according to claim 1 where R is methyl and Q is trifluoromethyl.

7. The 1 - oxide of 2 - (3 - fluoroanilino)pyridine according to claim 1 where R is hydrogen and Q is fluoro.

References Cited

Petrow: J. Chem. Soc., London, p. 927 (1945).

Abramovich et al.: J. Chem. Soc., London, p. 4263 (1954).

Klingsberg: Pyridine and Derivatives, part 2, Interscience, pp. 97–103 (1961).

HENRY R. JILES, Primary Examiner.

ALAN L. ROTHMAN, Assistant Examiner.

U.S. Cl. X.R.

260—999